UNITED STATES PATENT OFFICE 2,632,766

SULFATED N - HYDROCARBON-SUBSTITUTED - α - HYDROXYCARBOXYLIC AMIDES

Peter L. de Benneville, Philadelphia, Pa., assignor to Rohm & Haas Company, Philadelphia, Pa., a corporation of Delaware No Drawing. Application December 16, 1949, Serial No. 133,469

10 Claims. (Cl. 260—457)

This invention deals with compounds of the formula

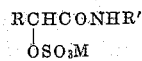

wherein R is an aliphatic hydrocarbon group of six to ten carbon atoms or a cycloaliphatic hydrocarbon group of ten carbon atoms, R' is an alkyl group of eight to fifteen carbon atoms or a cycloalkyl group of ten carbon atoms, and M is a salt-forming group. These compounds are useful wetting, penetrating, emulsifying, and dispersing agents, which can be used in neutral, acidic or basic solutions.

The sulfates of this invention differ from previously known sulfates not only in chemical configuration but in properties. Probably the most distinguishing feature is the stability of the compounds of this invention. Thus, acidic solutions or basic solutions thereof can be made, stored, and used without change in capillary activity. These compounds may be used, for example, in kier-boiling with satisfactory results. Another advantage of these new compounds lies in the fact that they may be produced from cheap and available raw materials.

For many of the new sulfates there may be taken as the primary starting materials olefins or terpenes, which are converted to aldehydes. It is, of course, possible and sometimes even desirable to start with aldehydes which are obtained from other sources than olefins or terpenes and which have the required molecular size. The aldehydes are converted into cyanohydrins, which are in turn reacted with olefins or terpenes in the presence of a strong acid and with water to give N-hydrocarbon substituted α-hydroxycarboxylic amides. These are then sulfated at the hydroxyl group. The resulting sulfates are converted to their salt form with a salt forming group.

Aldehydes suitable for yielding the cyanohydrins and their amides have the structure

where R is an aliphatic hydrocarbon group of six to ten carbon atoms or an alicyclic hydrocarbon group of ten carbon atoms. Typical aldehydes include n-heptaldehyde, 2-ethylhexaldehyde, 5,5-dimethylhexaldehyde, 3,5-dimethylhexaldehyde, n-octaldehyde, 2-ethyl-3-propylacrolein, 3, 5, 5-trimethylhexaldehyde, 5,7-dimethyloctaldehyde, 2,4,6-trimethylheptaldehyde, and undecaldehyde, mixtures of such aldehydes, and cycloaliphatic aldehydes obtained from $C_{10}H_{16}$ terpenes by addition of a

group thereto, such as homoisocamphanilanaldehyde.

Many of the above-named aldehydes and similar aldehydes are obtained from olefines or terpenes through the "oxo" reaction, wherein an olefin or terpene is reacted with hydrogen and carbon monoxide under pressure in the presence of a cobalt catalyst. Individual unsaturated hydrocarbons or mixtures of such hydrocarbons may be used. A mixture of carbon monoxide and hydrogen in molar proportions from 1:2 to 2:1 is passed through the unsaturated hydrocarbon mixed with cobalt catalyst. Pressures up to 1500 or more atmospheres at temperatures from about 40° to about 300° C. are used. The particular temperatures and pressures used will depend one upon the other as explained, for example, in U. S. Patent No. 2,327,066, to give an optimum yield of aldehyde, which is separated from the reaction mixture. Typical hydrocarbons which may thus be converted to aldehyde include hexenes, heptenes, octenes, nonenes, decenes, and terpenes, such as 4,4-dimethyl-1-pentene, diisobutylene, propylenetrimer, and camphene. The unsaturated starting materials are thus olefinically unsaturated hydrocarbons and may be straight chained, branched chained, or cyclic.

As a step in reaching the final products of this invention, an aliphatic or cycloaliphatic aldehyde having a total of seven to eleven carbon atoms is converted to its cyanohydrin. A convenient method for accomplishing this is by reaction with hydrogen cyanide in the presence of an alkaline catalyst, such as an alkali metal cyanide, an alkaline earth cyanide, or an amine, particularly a tertiary amine. Useful amines comprise pyridine, methylpiperidine, piperidine, triethanolamine, tributylamine, etc. Only a small amount of catalyst is needed, amounts varying from about 0.5% to 5% being sufficient. The reaction temperature is conveniently held between −30° C. and 25° C., although temperatures up to 50° C. can be used. The range below 25° C. is particularly desirable when liquid hydrogen cyanide is used. This is chilled and run into the reaction mixture, the temperature of which is controlled by cooling. When the required amounts of reactants have been combined, the reaction mixture is stirred for a short time, desirably with warming to complete the reaction. The catalyst is then neutralized with an acid, such as acetic, sulfuric, or phosphoric. Excess hydrogen cyanide is swept out with an inert gas, such as nitrogen. The mixture may be filtered. The product thus obtained is quite pure cyanohydrin.

A typical preparation of a cyanohydrin such as used in the process of this invention follows. A charge of 1000 parts by weight of 3,5,5-trimethylcaproaldehyde and 10 parts of triethanolamine was placed in a reaction vessel equipped with a thermometer, sealed stirrer, reflux condenser through the jacket of which ice water was circulated, and jacketed buret also cooled with ice water. The buret was filled with liquid hydrogen cyanide drawn from a cylinder in an ice-salt bath. Hydrogen cyanide was run into the aldehyde while the reaction mixture was kept below 20° C. by external cooling. A total of 115 parts by weight of hydrogen cyanide was run in during the course of an hour while the mixture was stirred. Stirring was continued for an hour with the reaction mixture warmed to 25° C. About seven parts of phosphoric acid was added to destroy the catalyst and the reaction mixture was warmed to 50° C. to drive off free hydrogen cyanide. The reaction mixture was filtered to yield 2-hydroxy-4,6,6-trimethylheptonitrile. Other cyanohydrins or α-hydroxy nitriles can be formed in the same way.

The next step is the conversion of a cyanohydrin to an α-hydroxycarboxylic amide. This is accomplished by reacting together the cyanohydrin, water, and an olefin of eight to fifteen carbon atoms or a terpene in the presence of a strong acid, particularly sulfuric acid, or boron trifluoride hydrate. Suitable olefins include diisobutylene, propylene trimer, tetramer and pentamer, decene, dodecene, and other olefins of eight to fifteen carbon atoms and mixtures of olefins, including both straight and branched chained olefins. The water and acid should be used in amounts at least molecularly equivalent to the cyanohydrin for complete reaction. Excess water and acid give the best results, a ratio of 1.5 of acid to cyanohydrin being apparently optimum. The amount of olefinic or terpenic hydrocarbon for best results should be about equivalent to the cyanohydrin, although somewhat more hydrocarbon can be used without development of troublesome by-products. If excess olefin is used, unreacted olefin can in most cases be readily removed at the end of the reaction by steam distillation of the amide.

Suitable concentrations of sulfuric acid lie between 50% and 96% sulfuric acid. A concentration near that corresponding to the monohydrate (80% to 90%) is particularly convenient and gives excellent results.

The acid is mixed with cyanohydrin and unsaturated hydrocarbon. The temperature of the reaction mixture is kept in the range of 30° to 60° C., if necessary, by cooling. The reaction is desirably left standing or stirred to allow time for completion of the reaction. The reaction mixture is freed of acid by mixing with water and neutralization with an alkaline reagent, such as caustic soda or soda ash. The reaction product, separated from the water layer, with or without the aid of an organic solvent, such as ether or benzene, is now obtained as a residue by warming under reduced pressure and stripping off volatile material. The product thus obtained is suitable for sulfating.

This step is carried out with chlorosulfonic acid, concentrated sulfuric acid, oleum, or sulfur trioxide. Sulfation is usually performed at a temperature between 0° and about 40° C. Excess reagent can be removed by extraction or by washing with water and neutralization. The sulfated product is converted to a salt by reaction with an alkaline reagent. There may thus be formed the economical sodium or potassium sulfates or other alkali metal sulfate. Similarly, the salt forming group may be an amine, such as triethanolamine, ethanolamine, one of the methylamines, or other lower alkyl amines, morpholine, piperidine, pyridine, and the like, or the ammonium or small quaternary ammonium groups, such as the tetramethylammonium or trimethylbenzylammonium groups.

The sulfates have excellent wetting, penetrating, and deterging actions. They are remarkable for their stabilities against alkali and acid. For example, solutions of representative sulfates of this invention were made in 1% solutions of sodium hydroxide and hydrochloric acid respectively. They were stored for six weeks at 30° C. No appreciable change was observed in any of the solutions. Again, even under the vigorously basic conditions of kier-boiling the compounds of this invention have been found to retain their surface activity and effectiveness.

Typical examples follow to illustrate the preparation of the sulfated amides of this invention. Parts are by weight.

A. *Preparation of amides*

EXAMPLE 1

A solution was prepared from 50 parts of 95% sulfuric acid in 400 parts of glacial acetic acid. Thereto was added 93 parts of 3,5,5-trimethylhexaldehyde cyanohydrin with the temperature at about 15° C. This mixture was stirred while 56 parts of diisobutylene was slowly added and the temperature was kept below 40° C. by cooling. Stirring was continued for an hour and the reaction mixture was then set aside for 20 hours. The reaction mixture was then poured onto crushed ice. Ether was added to extract the product. The organic layer was washed with water to remove acetic acid. The ether solution was warmed under reduced pressure to yield a residue which was a thick, amber-colored product. It corresponded in composition to N-1,1,3,3-tetramethylbutyl - 4,6,6 - trimethyl - 2 - hydroxyheptanamide. The product as obtained contained by analysis 4.68% of nitrogen (theory 4.50%).

EXAMPLE 2

There were mixed 20.4 parts of 96% sulfuric acid and 3.6 parts of water. The mixture was cooled to 10° C. and 33.8 parts of 3,5,5-trimethylhexaldehyde cyanohydrin added. The resulting mixture was stirred and thereto was slowly added 44 parts of propylene tetramer while the reaction mixture was kept between 32° and 37° C. by cooling. The reaction mixture was left standing for about 16 hours. It was then poured on ice and neutralized with sodium carbonate solution. The product was extracted with ethyl ether. The ether extract was dried over anhydrous sodium sulfate and evaporated to yield a thick, reddish oil. This product was identified as an N-dodecyl-2-hydroxydecanamide. The product as obtained contained by analysis 3.9% of nitrogen (theory 3.94%).

EXAMPLE 3

A mixture of 25 parts of 96% sulfuric acid, 3.5 parts of water, and 42 parts of 3,5,5-trimethylhexaldehyde cyanohydrin was prepared. Thereto over a 45 minute period there was slowly added 49 parts of a propylene polymer consisting in large part of the pentamer but having an average molecular weight corresponding to tetradecylene. During mixing the temperature was kept between 30° and 40° C. The mixture was allowed to stand for 16 hours and poured in to water. The resulting mixture was stirred until the dark color due to amido-sulfate had disappeared. It was then extracted with ether. The extract was separated, dried, and evaporated to yield 80.5 parts of a dark amber liquid which corresponded in composition to an N-tetradecyl-2-hydroxydecanamide.

EXAMPLE 4

To a mixture of 33.8 parts of nonaldehyde cyanohydrin and 33.6 parts of propylene tetramer there was added dropwise with stirring at 60° C. a mixture of 20.4 parts of sulfuric acid and 2.35 parts of water. The mixture was stirred and held at 60° C. for three hours, poured into water, and washed with sodium carbonate solution. The organic layer was separated and dried to yield 42 parts of an oil which corresponded in composition to an N - dodecyl - 2 - hydroxydecanamide, the dodecyl group being that derived from the polypropylene.

EXAMPLE 5

To a mixture of 30.8 parts of 2-ethyl-3-propylacrolein cyanohydrin, 20 parts of concentrated sulfuric acid and 120 parts of dibutyl ether there was slowly added with stirring at 35°–40° C. 33.8 parts of propylene tetramer. The reaction mixture was stirred for 1.5 hours and left standing for 16 hours. It was then poured on ice. An upper layer formed which was a solution of product in dibutyl ether. This layer was separated and stripped to yield 48.5 parts of an oil which corresponded in composition to N-dodecyl-2-hydroxyl-3-ethyl-4-heptenamide, the dodecyl group being the branched chain derived from propylene tetramer.

EXAMPLE 6

The procedure of Example 5 was followed, but 30.8 parts of 2-ethylhexaldehyde cyanohydrin was used in place of the 2-ethyl-3-propylacrolein. There was obtained 61 parts of a dark oil which was found to be N-dodecyl-2-hydroxy-3-ethylheptanamide.

EXAMPLE 7

The procedure of Example 5 was followed, but 27 parts of n-heptaldehyde cyanohydrin was used. The residual oil obtained was found to have the composition required for N-dodecyl α-hydroxycaprylamide, the dodecyl group being the branched chain obtained from the propylene tetramer.

EXAMPLE 8

In accordance with the procedures of Examples 5 through 7, there were used 42.3 parts of 3,5,5-trimethylhexaldehyde cyanohydrin and 34 parts of camphene to yield 80 parts of a thick amber oil which corresponded in composition to N-dihydrocamphenyl-2-hydroxydecanamide.

EXAMPLE 9

The procedure of Example 8 was followed with substitution of turpentine for the camphene. A similar product was obtained which corresponded to N-dihydroterpenyl-2-hydroxydecanamide.

EXAMPLE 10

To a mixture of 18 parts of 96% sulfuric acid and 60 parts of dibutyl ether was added 19 parts of homoisocamphanilanaldehyde cyanohydrin. This material had been prepared by the reaction of camphene with carbon monoxide and hydrogen in the presence of a cobalt catalyst to yield an aldehyde, which was reacted with hydrogen cyanide in the presence of a trace of piperidine to yield the above cyanohydrin. To the above mixture there was added with stirring 16.8 parts of propylene tetramer. The temperature during addition was held at 35°–40° C. The mixture was stirred for about two hours and then allowed to stand for 16 hours. It was then poured onto ice. A dibutyl ether layer formed and was separated. It was dried over anhydrous sodium sulfate and heated on a steam bath under reduced pressure. There was obtained an oily residue which was identified as the N - dodecyl - α - hydroxy - α - camphanylacetamide.

In the same way 19 parts of homoisocamphanilanaldehyde cyanohydrin and 14 parts of turpentine were reacted. The product obtained corresponded in composition to N-dihydroterpenyl-2-hydroxy-2-camphanylacetamide.

EXAMPLE 11

There were mixed 84.5 parts of nonaldehyde cyanohydrin and 84 parts of propylene tetramer and thereto was added over a 30 minute period 92 parts of 80% sulfuric acid while the temperature of the reaction mixture was held at 35°–40° C. by external cooling. The mixture was stirred four hours and added to water. The aqueous mixture was neutralized with sodium hydroxide solution and extracted with ethyl ether. The ether extract was dried and evaporated to yield 161.5 parts of red oil which was identified as an N-dodecyl-2-hydroxydecanamide.

EXAMPLE 12

In the same way there were taken 91.5 parts of n-undecanaldehyde cyanohydrin (from decene subjected to the "oxo" reaction followed by reaction with hydrogen cyanide), 56 parts of diisobutylene, and 90 parts of 80% sulfuric acid. An oily residue was obtained from the ether extract, amounting to 151 parts and corresponding in composition to N-1,1,3,3-tetramethylbutyl-2-hydroxydodecanamide.

EXAMPLE 13

Into 9 parts of water there was run 33.9 parts of boron trifluoride gas to give boron trifluoride monohydrate. Thereto was slowly added with cooling 84.5 parts of 3,5,5-trimethylhexaldehyde cyanohydrin and 84 parts of propylene tetramer. The mixture was stirred for three hours, left standing overnight, and poured into water. The organic layer was separated and washed three times with water. It was then stripped under reduced pressure to yield 162 parts of a light orange oil which corresponded in composition to N-dodecyl-2 - hydroxy-4,6,6-trimethylheptanamide, the dodecyl group being the branched radical derived from the propylene polymer.

Replacement of the propylene tetramer with an equal weight of dodecene yields an amide with the same empirical formula, N-$n$-dodecyl-2-hydroxy-4,6,6-trimethylheptanamide.

EXAMPLE 14

The above procedure was repeated with 35.5 parts of n-heptaldehyde cyanohydrin and 49 parts of propylene polymer mixture averaging $C_{14}H_{28}$. The product corresponded in composition to N-tetradecyl-2-hydroxycaprylamide, being a mixture, however, of N-alkyl amides in which the N-alkyl groups vary as obtained from the propylene polymers.

By the methods illustrated above there may be reacted any aldehyde cyanohydrin,

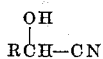

where R is an aliphatic hydrocarbon group of six to ten carbon atoms or cycloalkyl group of ten carbon atoms, with an olefinic or terpenic hydrocarbon group. Under the influence of a strong acid, water is added to yield an amide RCH(OH)CONHR' where R' corresponds to the hydrocarbon group derived from an olefin or terpene. The amide is taken for sulfation, which is illustrated in the following examples.

B. *Sulfation of α-hydroxycarboxylic amides*

EXAMPLE 15

A solution of 29.9 parts of N-1,1,3,3-tetramethylbutyl-4,6,6-trimethyl-2-hydroxyheptanamide in 120 parts of anhydrous diethyl ether was cooled to 0° C. Thereto was slowly added over a period of 25 minutes a solution of 10.5 parts of chlorosulfonic acid in 11 parts of diethyl ether while the reaction mixture was maintained at 0° C. The mixture was stirred and kept at this temperature for three hours. During this time the free acid of the sulfated hydroxyamide precipitated as a white crystalline product. This was filtered off and amounted to 21.5 parts.

A solution of 16.5 parts of this free acid was made in 75 parts of water. The solution was carefully neutralized with a 10% sodium hydroxide solution. The solution was evaporated to dryness to give the sodium salt of sulfated N-1,1,3,3-tetramethylbutyl-2-hydroxy-3,5,5-trimethylheptanamide. This product gave a slightly turbid water solution which had good surface active properties. A solution of 0.25% concentration wet a standard canvas patch in 5.7 seconds. It was found effective in kier-boiling of cotton.

EXAMPLE 16

A solution was made of 17.1 parts of N-dodecyl-2-hydroxy-3-ethylheptanamide (the dodecyl group being derived from propylene tetramer) in 13 parts of glacial acetic acid. Thereto was added dropwise at 30°–40° C. 5.8 parts of chlorosulfonic acid. The mixture was stirred for an hour, poured on ice, and exactly neutralized with sodium hydroxide solution. The product was purified by solution in twice its weight of isopropanol. Salts which separated were removed by filtration. Water was added to give a 50% isopropanol-water mixture. This solution was extracted with heptane. The water-isopropanol solution was stripped to dryness to yield nine parts of a brittle solid. This was the sodium salt of the sulfuric ester of N-dodecyl-2-hydroxy-3-ethylheptanamide. A 0.5% solution thereof wet out a canvas patch in 4.1 seconds.

EXAMPLE 17

By the procedure of Example 16 there were reacted chlorosulfonic acid and the N-dihydroterpenyl-2-hydroxy-4,6,6-trimethylheptanamide in which the terpenyl group was obtained from turpentine. A 0.5% solution of the sodium sulfate therefrom gave a wetting out time of 2.8 seconds for a floating patch.

EXAMPLE 18

There were mixed as above 17 parts of N-dodecyl-2-hydroxy-3-ethyl-4-heptenamide in 13 parts of acetic acid and 5.8 parts of chlorosulfonic acid. The produce was obtained as the sodium salt as above. A 0.5% solution of this sulfate wet out a floating path in 4.1 seconds.

EXAMPLE 19

To a solution of 13.2 parts of dioxan in 300 parts of carbon tetrachloride there was added with cooling 8.0 parts of stabilized sulfur trioxide. With this solution maintained at 10° C. there was added thereto a solution of 35.5 parts of an N-dodecyl-2-hydroxydecanamide (cf. Example 11) in 200 parts of carbon tetrachloride over a period of 45 minutes. The mixture was then stirred for five hours. The reaction mixture was evaporated after it had been neutralized with a 10% sodium hydroxide solution. There was obtained 46 parts of the dry sodium salt of the sulfate of the above amide. It exhibited excellent surface activity in aqueous solutions.

EXAMPLE 20

The procedure of the previous example was followed with 41 parts of an N-dodecyl-α-hydroxycaprylamide (the dodecyl group resulting from use of propylene tetramer). There was added for neutralization triethanolamine and the product obtained by evaporation of the solvent and stripping under reduced pressure. An amber solid was obtained which was soluble in water and organic solvents. The solutions exhibited capillary activity, had low surface tensions, and gave very low interfacial tensions against mineral oil.

By use of sulfur trioxide or chlorosulfonic acid as shown in the recent examples any of the hydroxy amides prepared or defined above are converted to the acid sulfates. These sulfates may be converted to salts with any base by neutralization. The same end result may be achieved without isolation or purification of the hydroxy amide, as will now be illustrated.

EXAMPLE 21

To a mixture of 42 parts of 3,5,5-trimethylhexaldehyde cyanohydrin and 49 parts of a propylene polymer mixture which was predominantly the $C_{15}$ olefin there was added dropwise at 30° C. 25 parts of sulfuric acid. During reaction the temperature was kept below 45° C. by external cooling. The reaction mixture was stirred for two hours and allowed to stand at room temperature for three days. It was then carefully neutralized with an aqueous sodium hydroxide solution and the resulting neutral solution was evaporated under reduced pressure. The product as thus obtained had good surface activity and was ready for use in this form.

Some of the residual product was, however, purified by solution in a 50% isopropanol solution in water. The solution was extracted with petroleum ether. The isopropanol-water solution was then evaporated to dryness to yield a hard solid which had excellent surface-active properties. A 0.05% aqueous solution gave a wetting out time of 11 seconds by the floating patch test. Unsulfated amide was recovered from the petroleum ether extract.

EXAMPLE 22

To a mixture of 84.5 parts of 3,5,5-trimethylhexaldehyde cyanohydrin and 84 parts of propylene tetramer there was slowly added with stirring 50 parts of concentrated sulfuric acid over a 45 minute period. The temperature of the reaction mixture was held between 35° and 45° C. Stirring was continued for four hours. The reaction product at this point was the imido sulfate,

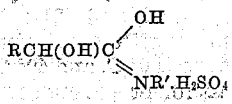

which was not isolated but 100 parts thereof was reacted directly with 31.3 parts of chlorosulfonic acid at temperatures of 35°–40° C. The reaction mixture was poured into ice and water. The resulting mixture was exactly neutralized with a 10% sodium hydroxide solution. It was evaporated to give a solid amber paste.

This paste was purified by solution in isopropanol, removal of insoluble salts by filtration, dilution with a volume of water equal to that of the isopropanol, and extraction of the isopropanol-water solution with heptane. The pure product was obtained upon evaporation of the alcoholic solution. There was obtained 48 parts of the sodium salt of sulfated N-dodecyl-2-hydroxy-4,6,6-trimethylheptanamide. It had excellent wetting properties. A 0.06% aqueous solution thereof gave a wetting out time of 10 seconds by the Draves test. The product is useful as an assistant in kier-boiling.

In this procedure sodium hydroxide may be replaced with an equivalent weight of triethanolamine, or ethanolamine, or morpholine to give the corresponding amine sulfates. Each one of these possesses capillary activity comparable to that of the sodium salt.

EXAMPLE 23

A solution was made from 13 parts of acetic acid and 18.8 parts of the N-dodecyl-2-hydroxy-2-camphanyl-acetamide (prepared from homoisocamphanilanaldehyde cyanohydrin and propylene tetramer). Thereto was added dropwise 5.8 parts of chlorosulfonic acid. The mixture was stirred for an hour, poured onto ice, and neutralized with a 10% potassium hydroxide solution. The product was purified as above to yield 11 parts of a yellow solid which was the potassium sulfate of the above hydroxy amide. A 0.1% aqueous solution thereof was clear. It gave a wetting out time of 12.7 seconds in the Draves test. The solution gave considerable foam.

EXAMPLE 24a

The procedure of Example 23 was followed with 15.6 parts of N-dihydrocamphenyl-2-hydroxydecanamide (N-dihydrocamphenyl-2-hydroxy-4,6,6-trimethylheptamide), but in this instance the sodium sulfate was formed. The aqueous solutions thereof were found quite capillary active.

EXAMPLE 24b

A product practically identical with the above was obtained upon sulfation by the same procedural steps using the N-dihydroterpenyl-2-hydroxydecanamide of Example 9.

EXAMPLE 24c

The sulfation reaction applied to the N-dihydroterpenyl-2-hydroxy-2-camphanylacetamide from Example 10 yielded a sodium sulfate of excellent wetting and penetrating power.

The products of Examples 24a and 24b have the formula

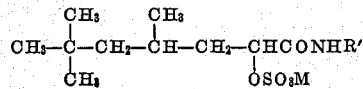

where R′ is dihydrocamphanyl or dihydroterpenyl, $C_{10}H_{17}$.

Similarly R′ may be an alkyl group, as typified by $C_{12}H_{25}$ as obtained from such olefins as propylene tetramer or dodecene. In the case of the polypropylene preparation of which the molecular weight corresponds to $C_{14}H_{28}$, R′ represents branched alkyl groups of 12 to 15 carbon atoms. An advantageous form for R′ is the diisobutyl group or 1,1,3,3-tetramethylbutyl group, derived from diisobutylene. These various N-substituents are typical of the groups obtainable from relatively cheap hydrocarbons.

EXAMPLE 25

In essentially the same manner as described in Example 11, except that the reaction mixture was stirred for one hour and allowed to stand overnight before being worked up, there was obtained from 127 parts of nonene (a trimer of propylene), 169 parts of 3,5,5-trimethylhexaldehyde cyanohydrin, and 184 parts of 80% sulfuric acid, 279 parts of a yellow oil containing by analysis 4.7% of nitrogen. This corresponds in composition to N-nonyl-2-hydroxydecanamide for which the theoretical nitrogen content is 4.5%.

EXAMPLE 26

To a solution of 31.1 parts of N-nonyl-2-hydroxydecanamide in 60 parts of anhydrous diethyl ether was added at 25° C. over a 15 minute period with stirring 14.0 parts of chlorosulfonic acid. After the mixture was stirred at 30° C. for one hour, it was poured on ice, neutralized with 10% sodium hydroxide solution to pH 8, and stripped to dryness. The product was dissolved in toluene and filtered to remove inorganic salts. The toluene was distilled off. The product was further purified by the residue being dissolved in a mixture of equal parts of isopropanol and water and was extracted with heptane. Evaporation of the water-isopropanol solution yielded 24 parts of the sodium salt of sulfated N-nonyl-2-hydroxydecanamide as a colorless wax which was water-soluble. A 0.1% solution of this material wet a standard canvas square in 12.3 seconds, indicating a high degree of surface activity.

I claim:

1. As new chemical substances, compounds of the formula

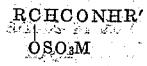

wherein R is a member of the class consisting of aliphatic hydrocarbon groups of six to ten carbon atoms and cycloalkyl groups of ten carbon atoms, R′ is a member of the class consisting of alkyl groups of eight to fifteen carbon atoms and cycloalkyl groups of ten carbon atoms, and M is a salt-forming group from the class consisting of alkali metal ions and strongly basic organic nitrogen-containing groups.

2. New chemical compounds of the formula

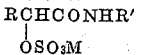

wherein R is an alkyl group of six to ten carbon atoms, R′ is an alkyl group of eight to fifteen carbon atoms, and M is an alkali metal cation.

3. New chemical compounds of the formula

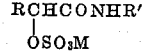

wherein R is an alkyl group of six to ten carbon atoms, R' is a camphanyl group and M is an alkali metal cation.

4. As a new chemical substance, a compound of the formula

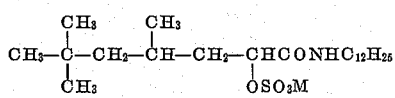

wherein M is a salt-forming group from the class consisting of alkali metal ions and strongly basic organic nitrogen-containing groups.

5. As new chemical substances, compounds of the formula

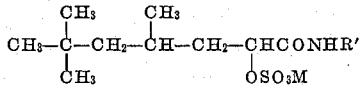

wherein R' represents branched chain alkyl groups from propylene polymers of 12 to 15 carbon atoms and M is a salt-forming group from the class consisting of alkali metal ions and strongly basic organic nitrogen-containing groups.

6. As a new chemical substance, a compound of the formula

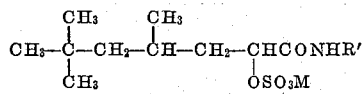

wherein R' is a dihydroterpenyl group and M is a salt-forming group from the class consisting of alkali metal ions and strongly basic organic nitrogen-containing groups.

7. As a new chemical substance, a compound of the formula

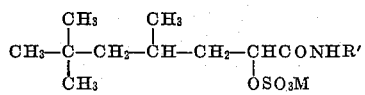

wherein R' is the 1,1,3,3-tetramethylbutyl group and M is a salt-forming group from the class consisting of alkali metal ions and strongly basic organic nitrogen-containing groups.

8. In the process of preparing compounds of the formula

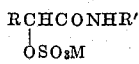

starting from an aldehyde, RCHO, hydrocyanic acid, and an olefinically unsaturated compound from the class consisting of olefins of eight to fifteen carbon atoms and terpenes of ten carbon atoms, wherein R is a member of the class consisting of aliphatic hydrocarbon groups of six to ten carbon atoms and cycloalkyl groups of ten carbon atoms, R' is a member of the class consisting of alkyl groups of eight to fifteen carbon atoms and cycloalkyl groups of ten carbon atoms, and M is a salt-forming group from the class consisting of alkali metal ions and strongly basic organic nitrogen-containing groups, the steps which include (1) reacting between 30° C. and 60° C. the cyanohydrin formed from aldehyde and hydrocyanic acid with a said olefinically unsaturated compound and with water in the presence of sulfuric acid, whereby an alpha-hydroxyamide is formed, and (2) reacting said alpha-hydroxyamide with a sulfating agent at a temperature between 0° C. and 40° C.

9. In a process for preparing compounds of the formula

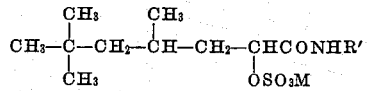

starting with 3,5,5-trimethylhexaldehyde, hydrogen cyanide, and propylene polymers of 12 to 15 carbon atoms, wherein R' represents the branch-chained alkyl groups from said propylene polymers and M is a salt-forming group from the class consisting of alkali metal ions and strongly basic organic nitrogen-containing groups, the steps which include (1) reacting between 30° C. and 60° C. the cyanohydrin formed from said aldehyde and hydrogen cyanide with said propylene polymers and with water in the presence of sulfuric acid, whereby an alpha-hydroxyamide is formed, and (2) reacting said alpha-hydroxyamide with a sulfating agent at a temperature between 0° C. and 40° C.

10. In a process for preparing compounds of the formula

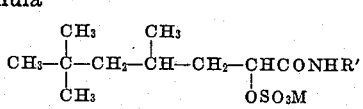

starting with 3,5,5-trimethylhexaldehyde, hydrogen cyanide, and a terpene, wherein R' represents a dihydroterpenyl group and M is a salt-forming group from the class consisting of alkali metal ions and strongly basic organic nitrogen-containing groups, the steps which include (1) reacting between 30° C. and 60° C. the cyanohydrin formed from said aldehyde and hydrogen cyanide with a terpene and with water in the presence of sulfuric acid, whereby an alpha-hydroxyamide is formed, and (2) reacting said alpha-hydroxyamide with a sulfating agent at a temperature between 0° C. and 40° C.

PETER L. DE BENNEVILLE.

REFERENCES CITED

The following references are of record in the file of this patent:

UNITED STATES PATENTS

| Number | Name | Date |
|---|---|---|
| 1,932,180 | Guenther | Oct. 24, 1933 |
| 2,185,541 | Cahn | Jan. 2, 1940 |

FOREIGN PATENTS

| Number | Country | Date |
|---|---|---|
| 343,899 | Great Britain | Feb. 9, 1931 |
| 499,022 | Great Britain | Jan. 9, 1939 |

OTHER REFERENCES

Ritter et al., Jour. Am. Chem. Soc. (December 1948), vol. 70, pages 4045 to 4048.